(12) United States Patent
Otsuki et al.

(10) Patent No.: US 11,524,407 B2
(45) Date of Patent: Dec. 13, 2022

(54) ROBOT SYSTEM AND OPERATING METHOD THEREOF

(71) Applicant: KAWASAKI JUKOGYO KABUSHIKI KAISHA, Kobe (JP)

(72) Inventors: Naohiro Otsuki, Kakamigahara (JP); Satoru Yamasumi, Itami (JP); Shinsuke Hamatani, Nishinomiya (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 517 days.

(21) Appl. No.: 16/810,886

(22) Filed: Mar. 6, 2020

(65) Prior Publication Data

US 2020/0206937 A1 Jul. 2, 2020

Related U.S. Application Data

(63) Continuation of application No. PCT/JP2018/033093, filed on Sep. 6, 2018.

(30) Foreign Application Priority Data

Sep. 7, 2017 (JP) .............................. JP2017-172196

(51) Int. Cl.
*B25J 9/16* (2006.01)
(52) U.S. Cl.
CPC ........... *B25J 9/1692* (2013.01); *B25J 9/1664* (2013.01)

(58) Field of Classification Search
CPC combination set(s) only.
See application file for complete search history.

(56) References Cited

U.S. PATENT DOCUMENTS

| 4,590,578 A | 5/1986 | Barto, Jr. et al. |
| 6,615,112 B1 | 9/2003 | Roos |
| 8,688,274 B2 * | 4/2014 | Shieh .................... B25J 9/1692 700/250 |
| 2013/0120547 A1 | 5/2013 | Linnell |
| 2022/0266882 A1 * | 8/2022 | Staab .................... B61L 25/025 |

FOREIGN PATENT DOCUMENTS

JP 4444033 B2 3/2010

* cited by examiner

*Primary Examiner* — Robert T Nguyen
(74) *Attorney, Agent, or Firm* — Xsensus LLP

(57) ABSTRACT

A robot system includes a robot that self-travels along a traveling shaft and is provided with a position detection sensor at a distal end, a support member that has a plurality of reference positions juxtaposed and supports a workpiece, a plurality of calibration members that are juxtaposed along the traveling shaft, and a control device, in which the calibration members each have a calibration position, and the control device is configured to cause the robot to move by a predetermined first distance along the traveling shaft, calibrate position coordinates of the robot based on position coordinates of the calibration positions detected by the position detection sensor, and subsequently calibrate position coordinates of the workpiece based on position coordinates of the reference positions detected by the position detection sensor.

20 Claims, 13 Drawing Sheets

ROBOT SYSTEM AND OPERATING METHOD THEREOF

CROSS-REFERENCES TO RELATED APPLICATIONS

The present application is a bypass continuation of PCT Application No. PCT/JP2018/033093, filed Sep. 6, 2018, which claims priority to JP 2017-172196, filed Sep. 7, 2017, both of which are incorporated herein by reference.

TECHNICAL FIELD

The present invention relates to a robot system and an operating method thereof.

BACKGROUND ART

A method for manufacturing an aircraft body is known, which aims to improve combination position accuracy of an aircraft fuselage and reduce the time required for combination and connection. In a method for manufacturing an aircraft body, position information of two fuselages is obtained, connecting position information when these fuselages are connected is calculated based on the obtained position information, and the two fuselages are moved based on the calculated connecting position information.

SUMMARY

A robot system includes a robot that self-travels along a traveling shaft and has an arm provided with a position detection sensor at a distal end, a support member that has a plurality of reference positions juxtaposed along an extending direction of the traveling shaft, and is configured to suspend and support a workpiece, a plurality of calibration members that are juxtaposed along the traveling shaft and each have a calibration position, and a control device, in which the control device is configured to cause the robot to move by a predetermined first distance set in advance along the traveling shaft, operate the robot so that the position detection sensor detects the calibration positions, calibrate position coordinates of the robot based on position coordinates of the calibration positions detected by the position detection sensor, subsequently operate the robot so that the position detection sensor detects the reference positions, and calibrate position coordinates of the workpiece based on position coordinates of the reference positions detected by the position detection sensor.

Thus, since calibration of the position coordinates of the workpiece is performed after the position coordinates of the robot are calibrated, positioning with respect to the workpiece can be performed with higher accuracy.

Further, since the workpiece is suspended and supported, the position coordinates are calibrated with the plurality of reference positions even when the workpiece is bent, and thus positioning with respect to the workpiece can be performed with higher accuracy.

Further, an operating method of a robot system in which the robot system includes a robot that self-travels along a traveling shaft and has an arm provided with a position detection sensor at a distal end, a support member that has a plurality of reference positions juxtaposed along an extending direction of the traveling shaft, and is configured to suspend and support the workpiece, and a plurality of calibration members that are juxtaposed along the traveling shaft and each have a calibration position, in which the operating method includes (A) causing the robot to move by a predetermined first distance set in advance along the traveling shaft, (B) operating the robot so that the position detection sensor detects the calibration positions, (C) calibrating position coordinates of the robot based on position coordinates of the calibration positions detected by the position detection sensor, (D) operating, after the (C), the robot so that the position detection sensor detects the reference positions, and (E) calibrating position coordinates of the workpiece based on position coordinates of the reference positions detected by the position detection sensor.

Thus, since calibration of the position coordinates of the workpiece is performed after the position coordinates of the robot are calibrated, positioning with respect to the workpiece can be performed with higher accuracy.

Further, since the workpiece is suspended and supported, the position coordinates are calibrated with the plurality of reference positions even when the workpiece is bent, and thus positioning with respect to the workpiece can be performed with higher accuracy.

DESCRIPTION OF EMBODIMENTS

Figure 1:
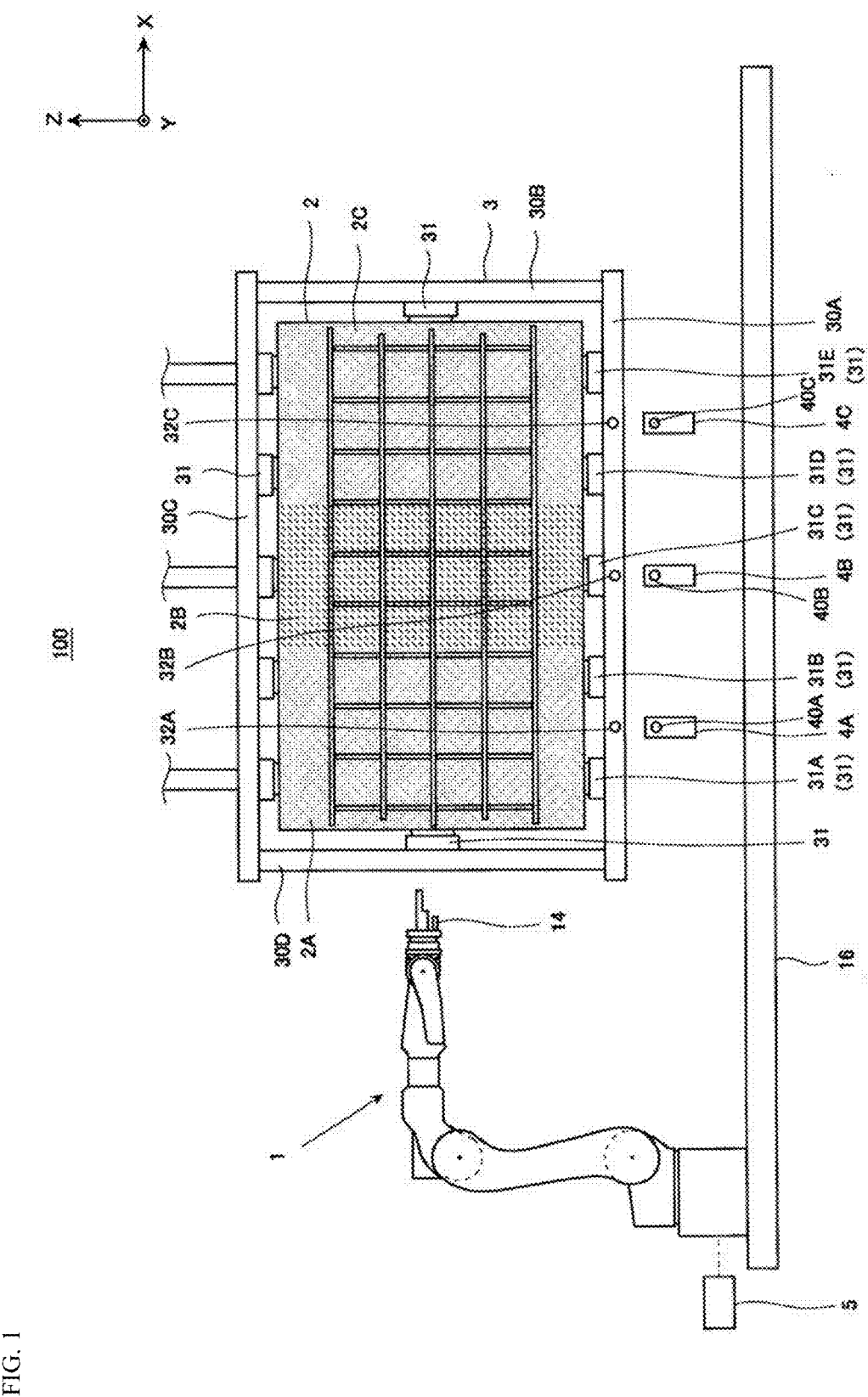
FIG. 1 is a schematic view illustrating a schematic configuration of a robot system according to Embodiment 1.

Hereinafter, embodiments of the present invention will be described with reference to the drawings. Note that in all the drawings, the same or corresponding parts are denoted by the same reference numerals, and redundant descriptions are omitted. Further, in all drawings, components for describing the present invention are extracted and illustrated, and illustration may be omitted about any other components. Furthermore, the present invention is not limited to the following embodiments.

Embodiment 1

The robot system according to Embodiment 1 includes a robot that self-travels along a traveling shaft and has an arm provided with a position detection sensor at a distal end, a plurality of calibration members that are juxtaposed along the traveling shaft and each have a calibration position, a support member that has a plurality of reference positions juxtaposed along an extending direction of the traveling shaft, and is configured to support a workpiece, and a control device, in which the support member is configured to be capable of moving the workpiece relative to the calibration positions, and the control device is configured to cause the robot to move by a predetermined first distance set in advance along the traveling shaft, operate the robot so that the position detection sensor detects the calibration positions, calibrate position coordinates of the robot based on position coordinates of the calibration positions detected by the position detection sensor, subsequently operate the robot so that the position detection sensor detects the reference positions, and calibrate position coordinates of the workpiece based on position coordinates of the reference positions detected by the position detection sensor.

Further, in the robot system according to Embodiment 1, the control device may be configured to divide the workpiece into a plurality of work sections for the respective reference positions, and perform calibration of the position coordinates of the workpiece for each of the work sections.

Further, in the robot system according to Embodiment 1, the control device may be configured to cause the robot to perform work on the workpiece from a work target area close to the reference positions on the workpiece after calibrating the position coordinates of the workpiece based on the position coordinates of the reference positions detected by the position detection sensor.

Further, in the robot system according to Embodiment 1, the support member may be formed in a frame shape, and a plurality of reference positions may be juxtaposed on a lower end portion.

Further, in the robot system according to Embodiment 1, the position detection sensor may be constituted of an optical sensor.

Furthermore, in the robot system according to Embodiment 1, the position detection sensor may be constituted of a camera.

Hereinafter, an example of the robot system according to Embodiment 1 will be described with reference to FIGS. 1 to 7.

[Configuration of Robot System]

FIG. 1 is a schematic view illustrating a schematic configuration of the robot system according to Embodiment 1. Note that in FIG. 1, directions in the robot system are represented by directions of an X axis, a Y axis, and a Z axis of a three-dimensional orthogonal coordinate system for convenience, and work sections in a workpiece are hatched.

As illustrated in FIG. 1, the robot system 100 according to Embodiment 1 includes a robot 1 that self-travels along a traveling shaft 16 and is provided with a position detection sensor 14 at a distal end, a support member 3 that suspends and supports a workpiece 2, a plurality of calibration members 4A, 4B, and 4C juxtaposed along the traveling shaft 16, and a control device 5, and the control device 5 is configured to calibrate position coordinates of the robot 1 and the workpiece 2 based on position coordinates detected by the position detection sensor 14.

Hereinafter, each device included in the robot system 100 according to Embodiment 1 will be described.

The robot 1 may be installed in a work space and configured to perform a series of tasks constituted of a plurality of processes, and may be a horizontal articulated robot or a vertical articulated robot. Note that as the series of tasks constituted of a plurality of processes, work such as assembly of a part to a product, painting, sealing, welding parts (friction stir spot welding work), deburring of a workpiece constituted of a CFRP, and the like can be exemplified.

Here, a specific configuration of the robot 1 will be described with reference to FIG. 2.

Figure 2:
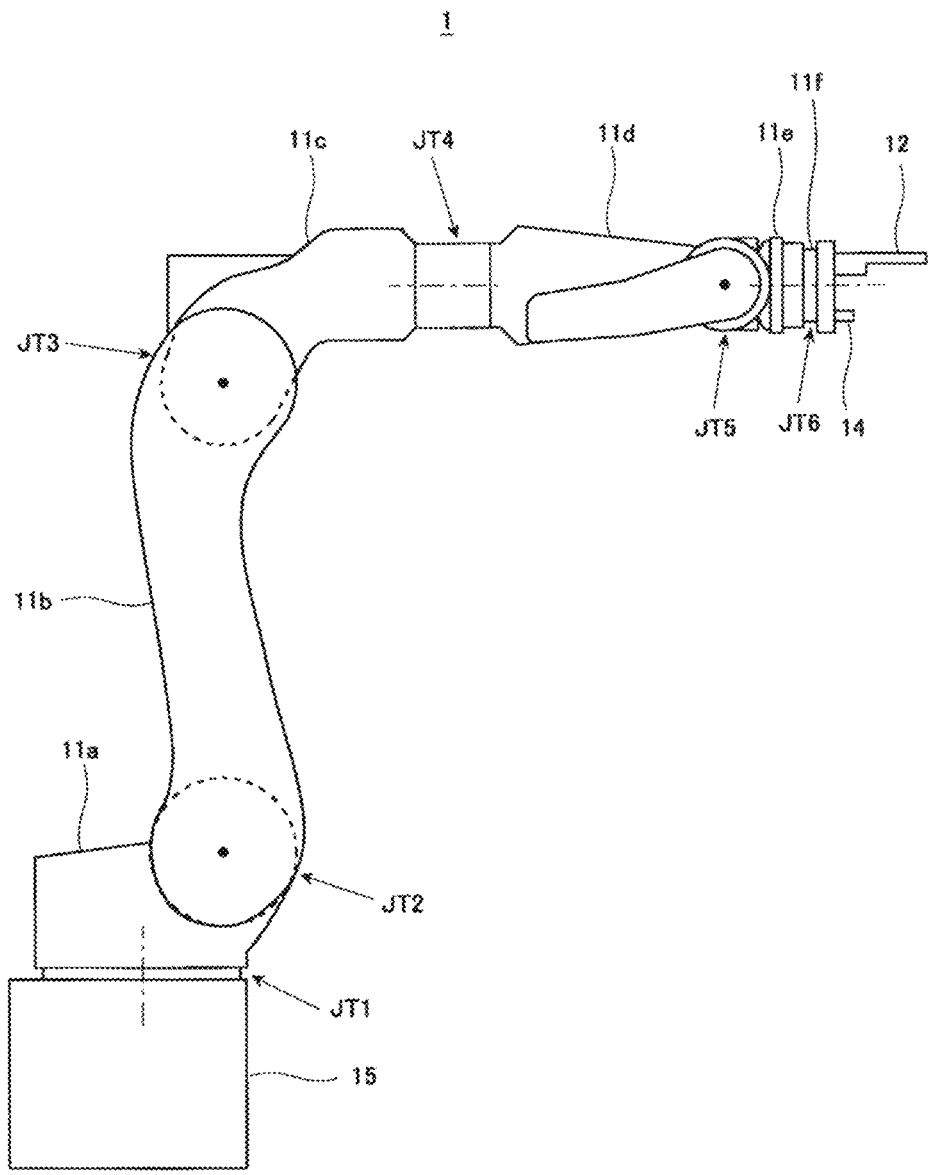
FIG. 2 is a schematic view illustrating a schematic configuration of a robot in the robot system illustrated in FIG. 1.

FIG. 2 is a schematic view illustrating a schematic configuration of the robot in the robot system illustrated in FIG. 1.

As illustrated in FIG. 2, the robot 1 is an articulated robot arm that has a connecting body of a plurality of links (here, a first link 11a, a second link 11b, a third link 11c, a fourth link 11d, a fifth link 11e, and a sixth link 11f), a plurality of joints (here, a first joint JT1, a second joint JT2, a third joint JT3, a fourth joint JT4, a fifth joint JT5, and a sixth joint JT6), and a base 15 that supports them. A lower end portion of the base 15 is provided with wheels (not illustrated), and the robot 1 is configured to be movable along the traveling shaft 16.

At the first joint JT1, the base 15 and a proximal end of the first link 11a are connected to be rotatable about an axis extending in a vertical direction. At the second joint JT2, a distal end of the first link 11a and a proximal end of the second link 11b are connected to be rotatable about an axis extending in a horizontal direction. At the third joint JT3, a distal end of the second link 11b and a proximal end of the third link 11c are connected to be rotatable about an axis extending in the horizontal direction.

Further, at the fourth joint JT4, a distal end of the third link 11c and a proximal end of the fourth link 11d are connected to be rotatable about an axis extending in a longitudinal direction of the fourth link 11d. At the fifth joint JT5, a distal end of the fourth link 11d and a proximal end of the fifth link 11e are connected to be rotatable about an axis orthogonal to the longitudinal direction of the fourth link 11d. At the sixth joint JT6, a distal end of the fifth link 11e and a proximal end of the sixth link 11f are connected to be twistable and rotatable.

Then, a mechanical interface is provided at a distal end of the sixth link 11f. An end effector 12 suited to a work task is detachably attached to the mechanical interface. Further, the position detection sensor 14 is disposed at the distal end of the sixth link 11f. The position detection sensor 14 is configured to detect calibration positions 40A, 40B, and 40C and reference positions 32A, 32B, and 32C, which will be described later, and output detected data to the control device 5. As the position detection sensor 14, for example, a camera, an optical sensor, or the like may be used.

Note that in Embodiment 1, a dispenser for applying a sealing agent is provided as the end effector 12. Further, a cartridge for supplying the sealing agent to the dispenser is provided in the dispenser.

Further, the first joint JT1 to the sixth joint JT6 are each provided with a drive motor (not illustrated) as an example of an actuator that relatively rotates two members which the joint couples. The drive motor may be, for example, a servo motor servo-controlled by the control device 5. Further, each of the first joint JT1 to the sixth joint JT6 is provided with a rotation sensor that detects a rotational position of the drive motor and a current sensor that detects a current controlling rotation of the drive motor (neither illustrated). The rotation sensor may be an encoder, for example.

Further, as illustrated in FIG. 1, a support member 3 is suspended in the work space. Thus, the support member 3 is capable of moving the workpiece 2 relative to a calibration position as described later.

The support member 3 may be configured to be suspended from a ceiling, or may be configured to be suspended by a crane or the like. Further, the support member 3 may be carried from outside the work space into the work space by an operator or a conveying apparatus (a conveying robot, a crane, a motor, a chain drive, or the like).

The support member 3 is formed in a frame shape, and four bar members 30A, 30B, 30C, and 30D constituting a frame are provided with fixing parts 31 that project inward. Here, the fixing part 31 is constituted of a pair of plate members, and is configured to sandwich and fix (support) the workpiece 2 by the pair of plate members. Note that the workpiece 2 may be a large panel used for an aircraft body.

On the bar member 30A of the support member 3, a plurality of reference positions (here, reference positions 32A, 32B, and 32C) are disposed at predetermined positions set in advance. Specifically, the reference positions 32A to 32C are juxtaposed along an extending direction of the traveling shaft 16. Further, the reference positions 32A to 32C are configured to be detectable by the position detection sensor 14. For example, when the position detection sensor 14 is constituted of a regression reflection type optical sensor, the reference positions 32A to 32C may be constituted of regression reflecting plates. Further, when the position detection sensor 14 is constituted of a camera, the reference positions 32A to 32C may each be constituted of a marker having a triangle shape, a quadrangular shape, a cross shape, a three-dimensional shape, or the like.

Distances (position coordinates) between the reference positions 32A to 32C and respective fixing parts 31A, 31B, 31C, 31D, and 31E provided on the bar member 30A are set in advance, and the distances (position coordinates) are stored in a storage unit (not illustrated) of the control device 5. Thus, when the position detection sensor 14 detects the reference positions 32A to 32C, the control device 5 can thereby calculate (calibrate) position coordinates of the workpiece 2 fixed by the fixing parts 31. Note that the control device 5 may be configured to divide the workpiece 2 into a plurality of work sections (here, a first work section 2A to a third work section 2C) respectively for the reference positions 32A to 32C, and perform a calculation (calibration) of position coordinates of the workpiece 2 and/or predetermined work on the workpiece 2 for each of the work sections.

Furthermore, as illustrated in FIG. 1, a plurality of calibration members (here, calibration members 4A, 4B, and 4C) are disposed at predetermined positions set in advance in the work space. Specifically, the calibration members 4A to 4C are juxtaposed at predetermined intervals along the extending direction of the traveling shaft 16 (here, the X-axis direction).

Calibration positions 40A to 40C are disposed on the calibration members 4A to 4C, respectively. The calibration positions 40A to 40C are disposed at predetermined positions set in advance, and are configured to be detectable by the position detection sensor 14. For example, when the position detection sensor 14 is constituted of a regression reflection type optical sensor, the calibration positions 40A to 40C may be constituted of regression reflecting plates. Further, when the position detection sensor 14 is constituted of a camera, the calibration positions 40A to 40C may each be constituted of a marker having a triangle shape, a quadrangular shape, a cross shape, a three-dimensional shape, or the like.

The control device 5 controls operations of the robot 1 (robot system 100). The control device 5 includes, for example, an arithmetic unit (not illustrated) constituted of a microcontroller, an MPU, a programmable logic controller (PLC), a logic circuit, or the like, and a storage unit (e.g., memory device) (not illustrated) constituted of a ROM, a RAM, and/or the like.

The functionality of the elements disclosed herein including but not limited to the control device 5 may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Further, the storage unit of the control device 5 may store position coordinates of the robot 1 and so on disposed in the work space that are created in advance with a three-dimensional CAD. Further, the storage unit of the control device 5 may store position coordinates of the robot 1 and so on disposed in the work space using image data obtained by scanning the robot 1 and so on with a three-dimensional scanner or the like.

Note that the control device 5 may be not only in a mode to be constituted of a single control device, but also in a mode to be constituted of a set of control devices such that a plurality of control devices cooperate to execute control of the robot 1 (robot system 100).

Further, in Embodiment 1, a mode is employed in which the control device 5 is disposed in the work space, but the embodiment is not limited to this. For example, a mode may be employed in which the control device 5 is disposed in the base 15 or any one of the links, or a mode may be employed in which the control device 5 is disposed outside the work space.

[Operations and Effects of Robot System]

Figure 4:
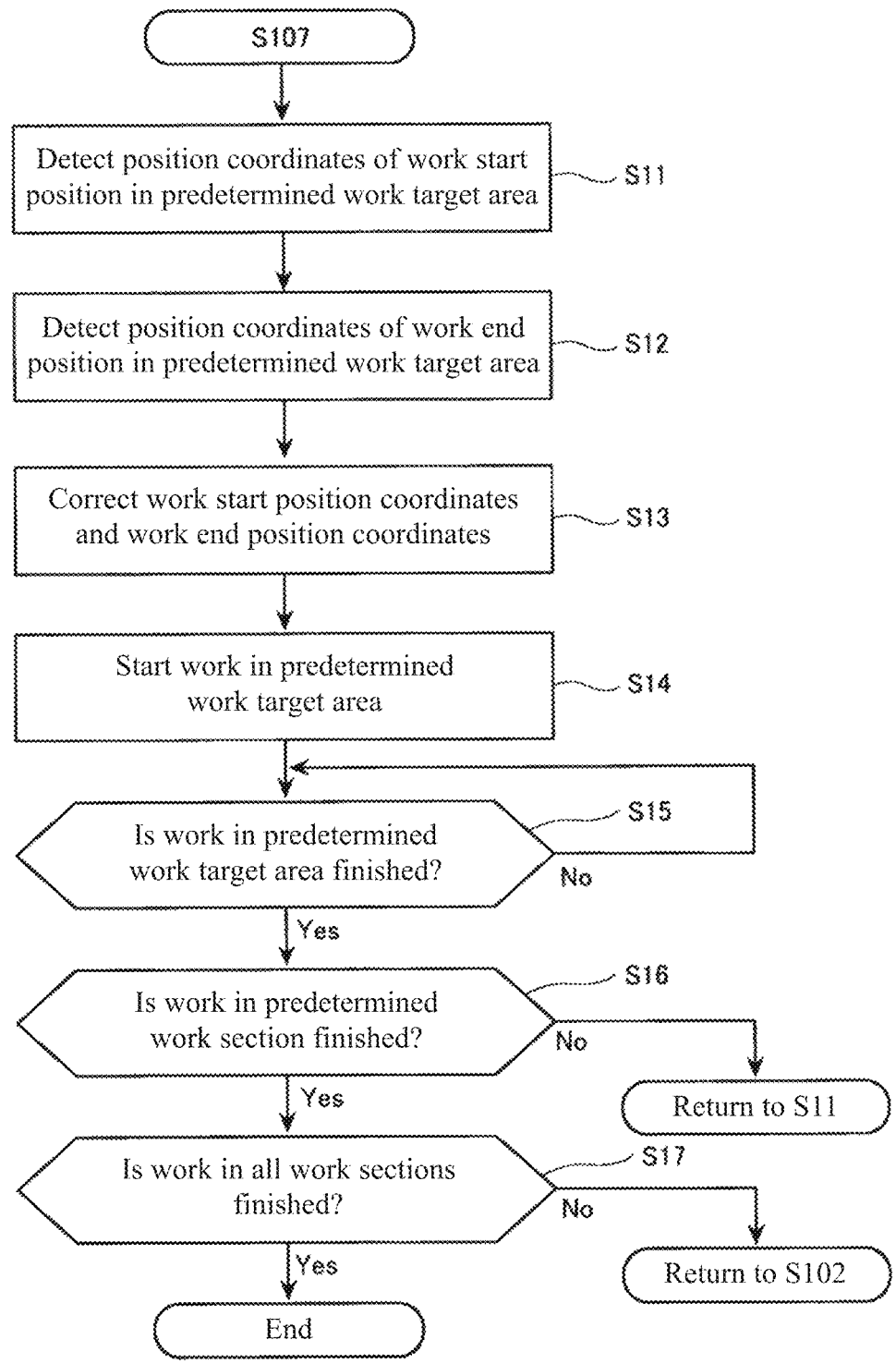
FIG. 4 is a flowchart illustrating contents of processing in step S107 illustrated in FIG. 3.
Figure 5:
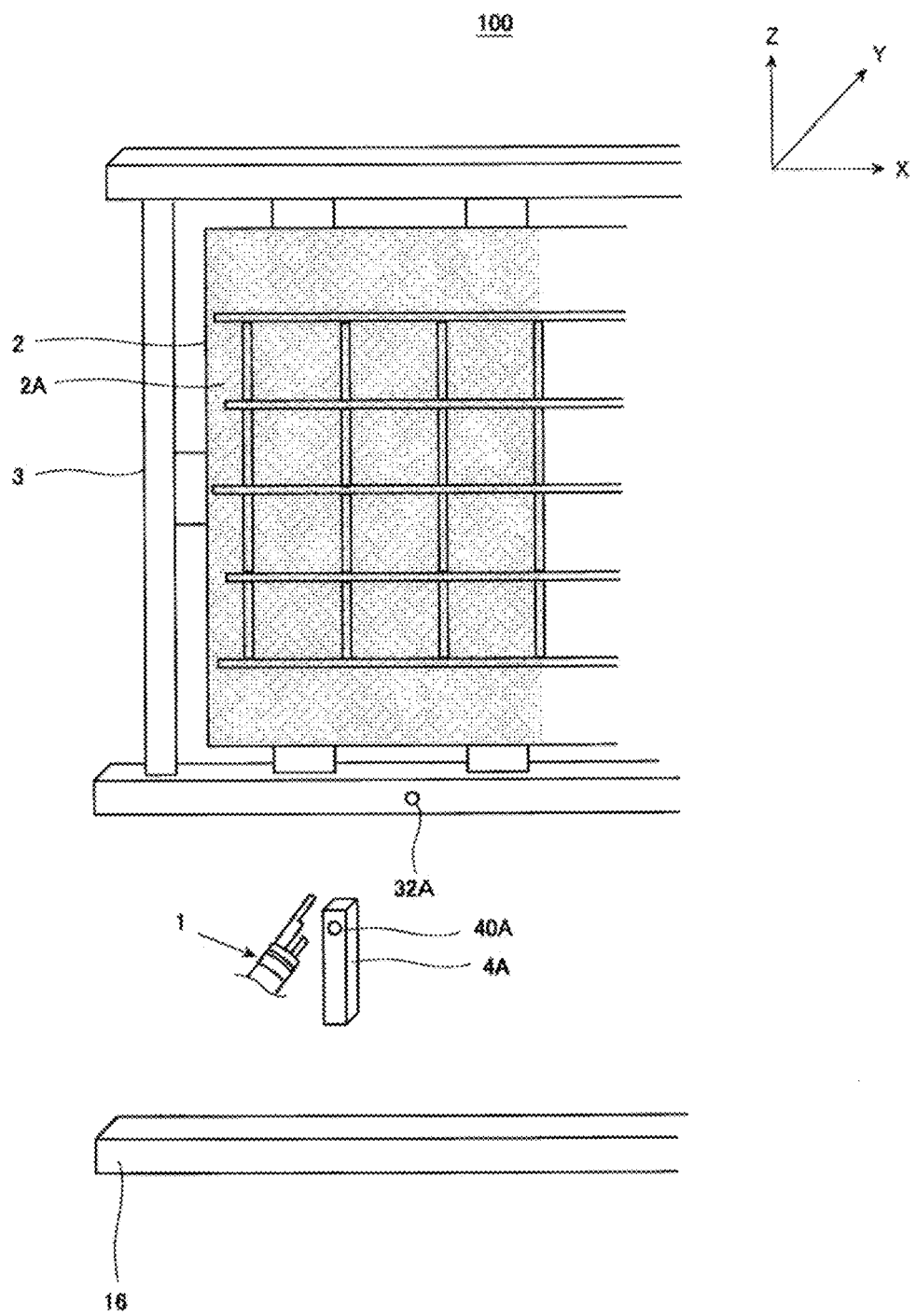
FIG. 5 is a schematic view illustrating an example of operation of the robot system according to Embodiment 1.
Figure 6:
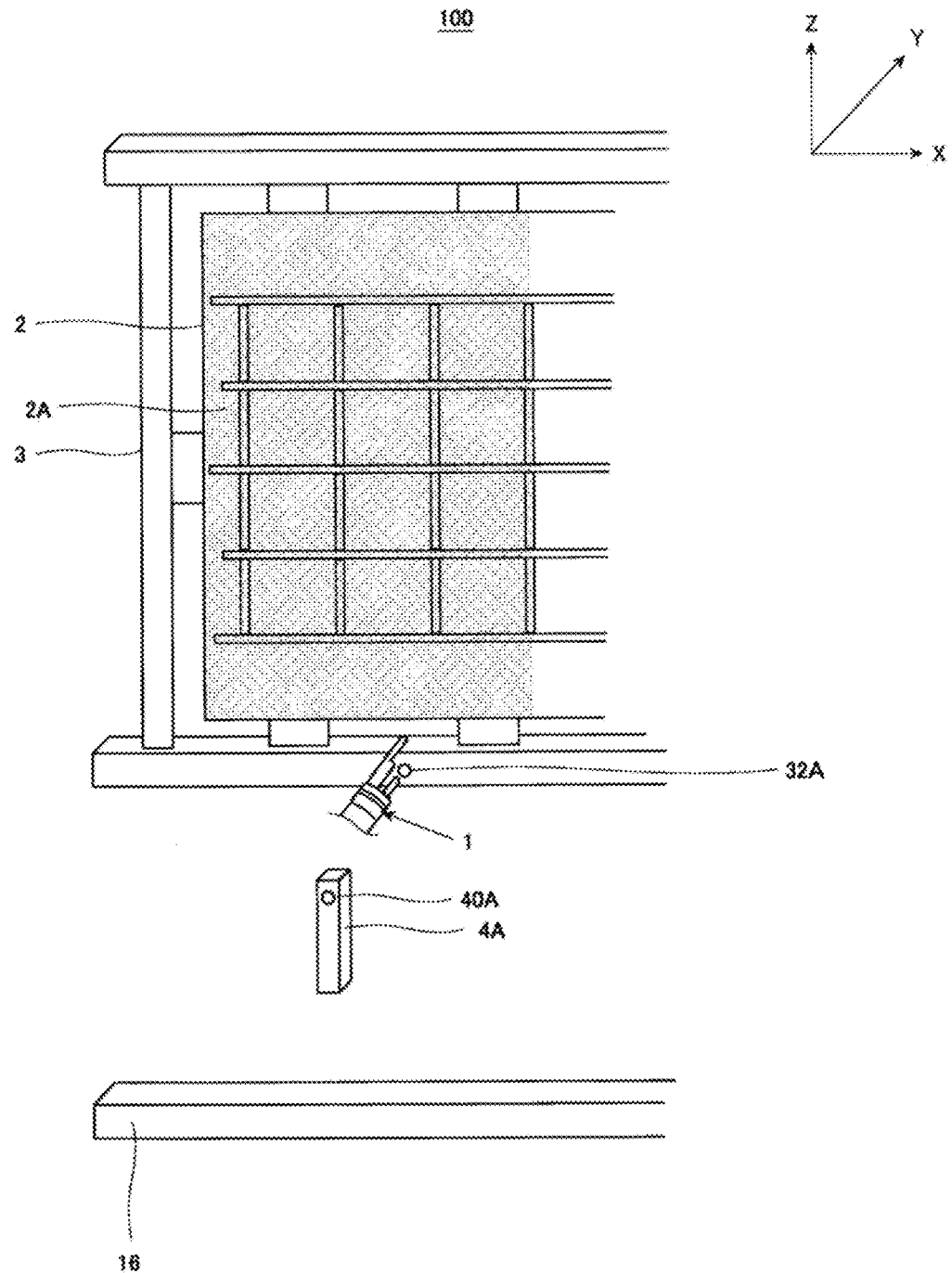
FIG. 6 is a schematic view illustrating an example of operation of the robot system according to Embodiment 1.
Figure 7:
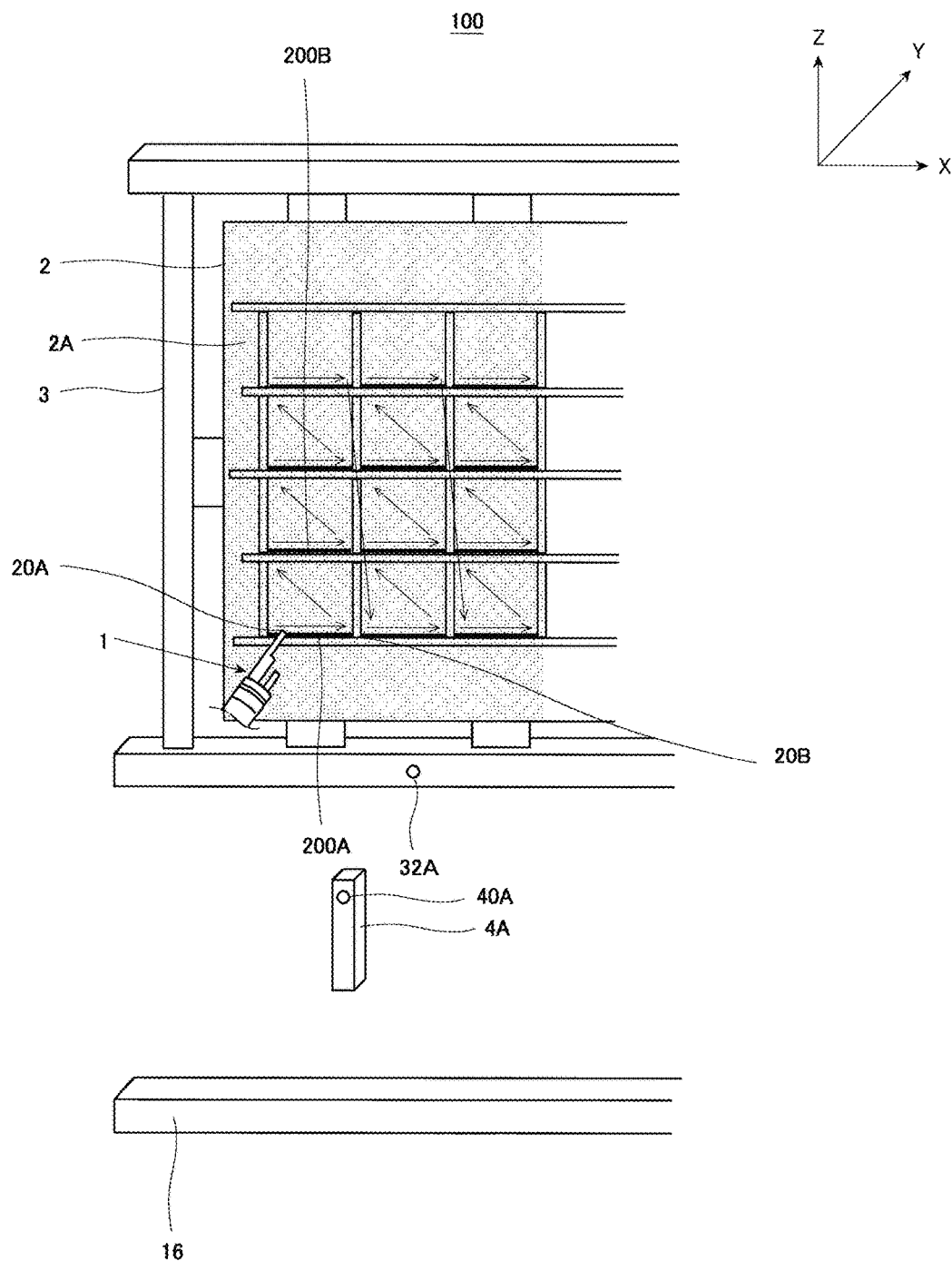
FIG. 7 is a schematic view illustrating an example of operation of the robot system according to Embodiment 1.

Next, operations and effects of the robot system 100 according to Embodiment 1 will be described with reference to FIGS. 1 to 7. Note that the following operations are executed by the arithmetic unit of the control device 5 reading out a program stored in the storage unit. Further, in the following, as illustrated in FIGS. 5 to 7, an operation of applying a sealing agent to the workpiece 2 will be described as a specific example of operation of the robot system 100 according to Embodiment 1.

Figure 3:
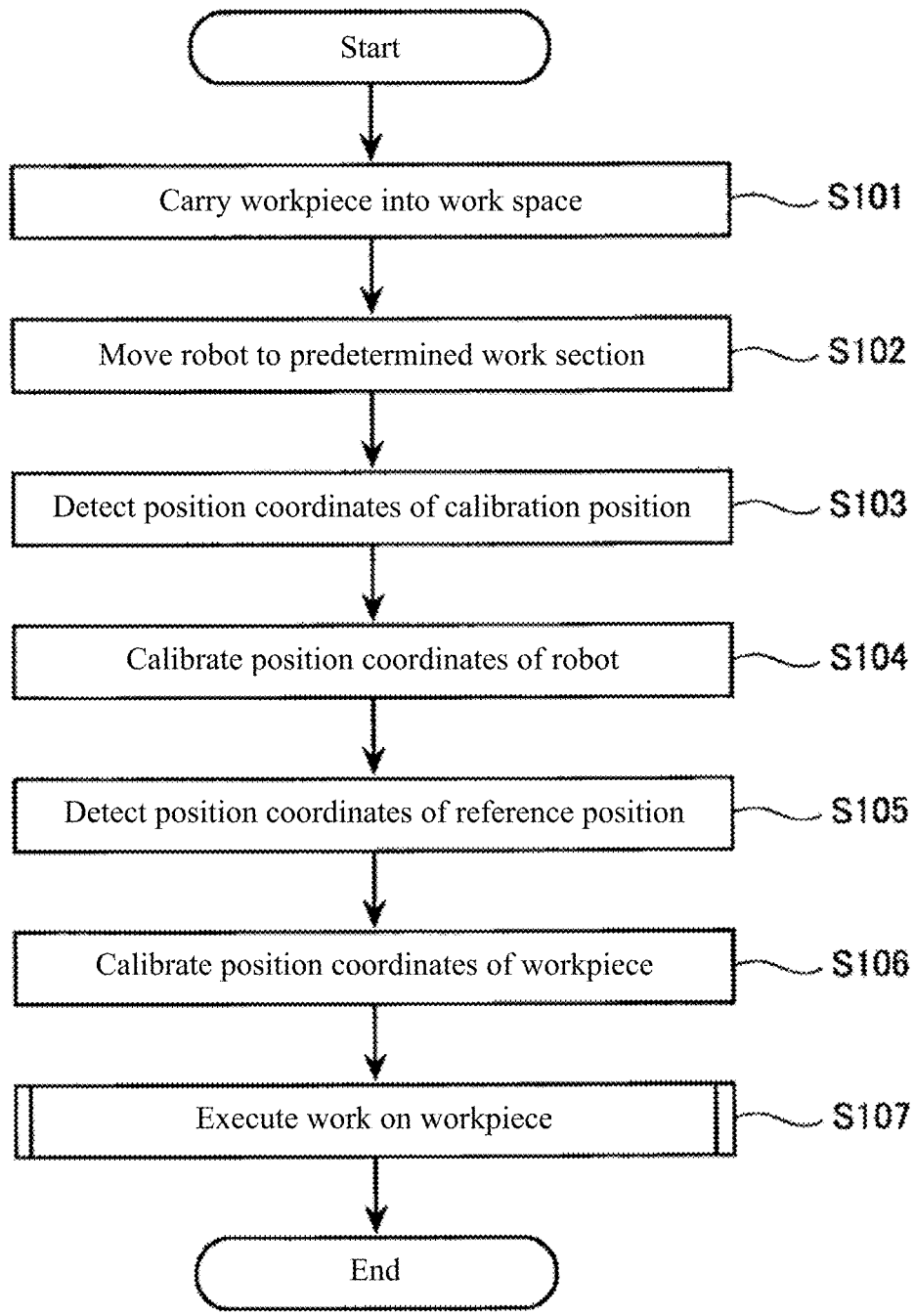
FIG. 3 is a flowchart illustrating an example of operation of the robot system according to Embodiment 1.

FIG. 3 is a flowchart illustrating an example of operation of the robot system according to Embodiment 1. FIG. 4 is a flowchart illustrating contents of a process in step S107 illustrated in FIG. 3. FIGS. 5 to 7 are schematic views illustrating examples of operation of the robot system according to Embodiment 1. Note that in FIGS. 5 to 7, a part of the robot system is omitted, and a work section in a workpiece is indicated by hatching for convenience. Further, in FIG. 7, a work target area is indicated by bold lines for convenience.

First, it is assumed that an operator operates an operating device that is not illustrated, so as to output operation start instruction information of starting an operation of the robot system 100 to the control device 5. Then, as illustrated in FIG. 3, the control device 5 causes the support member 3 fixing (supporting) a workpiece 2 by the fixing parts 31 to be carried into the work space by, for example, a conveying robot, a crane, or the like (step S101). At this time, the control device 5 may cause the support member 3 to be carried so that the reference position 32A of the support member 3 and the calibration position 40A of the calibration member 4A substantially coincide with each other when viewed along the Z-axis direction.

Note that the operator may manually carry the support member 3 supporting the workpiece 2 into the work space. Further, the operator may directly operate the conveying robot, the crane, or the like to carry the support member 3 supporting the workpiece 2 into the work space.

Next, the control device 5 causes the robot 1 to move to a predetermined work section (for example, the first work section 2A) (step S102). At this time, the control device 5 causes the robot 1 to move to predetermined position coordinates (a predetermined first distance) where the robot 1 can operate in the first work section 2A. Note that the predetermined position coordinates are stored in advance in the storage unit of the control device 5.

Next, the control device 5 operates the robot 1 so that the position detection sensor 14 can detect the calibration position 40A of the calibration member 4A, and obtains (detects) position coordinates of the calibration position 40A based on data related to the calibration position 40A detected by the position detection sensor 14 (step S103; see FIG. 5).

At this time, the control device 5 may control each drive motor so that each joint of the robot 1 rotates at a predetermined rotation angle set in advance. Thus, the robot 1 can operate so as to have the same posture every time.

Note that the data related to the calibration position 40A detected by the position detection sensor 14 is, for example, video information taken by a camera when the position detection sensor 14 is constituted of the camera. Further, the position coordinates of the calibration position 40A can be obtained by analyzing a video taken by the camera using publicly known video analysis software or the like.

Further, when the position detection sensor 14 is constituted of an optical sensor, the data is a rotation angle or a current value of each drive motor of the robot 1 when the optical sensor detects the calibration position 40A. Further, the position coordinates of the calibration position 40A can be obtained by inversely converting a rotation angle or a current value of each drive motor of the robot 1.

Next, the control device 5 calibrates position coordinates of the robot 1 based on the position coordinate information of the calibration position 40A obtained in step S103 (step S104). Specifically, the control device 5 compares the predetermined position coordinates used for moving the robot 1 in step S102 with the position coordinates of the calibration position 40A obtained in step S103, and calibrates the position coordinates of the robot 1.

Next, the control device 5 operates the robot 1 so that the position detection sensor 14 can detect the reference position 32A of the support member 3, and obtains (detects) position coordinate information of the reference position 32A based on data related to the reference position 32A detected by the position detection sensor 14 (step S105; see FIG. 6).

At this time, the control device 5 may control each drive motor so that each joint of the robot 1 rotates at a predetermined rotation angle set in advance. Thus, the robot 1 can operate so as to have the same posture every time.

Note that the data related to the reference position 32A detected by the position detection sensor 14 is, for example, video information taken by a camera when the position detection sensor 14 is constituted of the camera. Further, the position coordinates of the reference position 32A can be obtained by analyzing a video taken by the camera using publicly known video analysis software or the like.

Further, when the position detection sensor 14 is constituted of an optical sensor, the data is a rotation angle or a current value of each drive motor of the robot 1 when the optical sensor detects the reference position 32A. Further, the position coordinates of the reference position 32A can be obtained by inversely converting a rotation angle or a current value of each drive motor of the robot 1.

Next, the control device 5 calibrates position coordinates of the workpiece 2 (first work section 2A) based on the position coordinates of the reference position 32A obtained in step S105 (step S106). Specifically, the control device 5 compares the position coordinates of the robot 1 calibrated in step S104 with the position coordinates of the reference position 32A obtained in step S105, and calibrates the position coordinates of the workpiece 2.

Then, the control device 5 causes the robot 1 to perform predetermined work (here, sealing) on the workpiece 2 (step S107).

Next, a process in step S107 (predetermined work operation on the workpiece) will be described in detail with reference to FIGS. 4 to 7.

As illustrated in FIG. 4, the control device 5 operates the robot 1 so that the position detection sensor 14 can detect a work start position 20A (see FIG. 7) in a predetermined work target area (here, reference numeral 200A illustrated in FIG. 7). Specifically, the control device 5 operates the robot 1 based on position coordinates of the work start position 20A stored in the storage unit. Then, the control device 5 obtains (detects) the position coordinates of the work start position 20A based on data related to the work start position 20A detected by the position detection sensor 14 (step S11).

Note that the data related to the work start position 20A detected by the position detection sensor 14 is, for example, video information taken by a camera when the position detection sensor 14 is constituted of the camera. Further, the position coordinates of the work start position 20A can be obtained by analyzing a video taken by the camera using publicly known video analysis software or the like.

Next, the control device 5 operates the robot 1 so that the position detection sensor 14 can detect a work end position 20B (see FIG. 7) in the work target area 200A. Specifically, the control device 5 operates the robot 1 based on position coordinates of the work end position 20B stored in the storage unit. Then, the control device 5 obtains (detects) the position coordinates of the work end position 20B based on data related to the work end position 20B detected by the position detection sensor 14 (step S11).

Note that the data related to the work end position 20B detected by the position detection sensor 14 is, for example, video information captured by a camera when the position detection sensor 14 is constituted of the camera. Further, the position coordinates of the work end position 20B can be obtained by analyzing a video taken by the camera using publicly known video analysis software or the like.

Next, the control device 5 corrects (calibrates) the position coordinates of the work start position 20A and the work end position 20B based on the position coordinates of the work start position 20A and the work end position 20B detected in step S11 and step S12, and stores the corrected position coordinates of the work start position 20A and the work end position 20B in the storage unit (step S13).

Next, the control device 5 causes the robot 1 to start work in the work target area 200A (step S14). Specifically, the control device 5 operates the robot 1 based on the position coordinates of the work start position 20A and the work end position 20B corrected in step S13, so as to apply the sealing agent from the dispenser.

Next, the control device 5 determines whether or not the work in the work target area 200A is finished (step S15). If it is determined that the work in the work target area 200A is not finished (No in step S15), the control device 5 continues the process in step S15 until the work in the work target area 200A is finished. On the other hand, if it is determined that the work in the work target area 200A is finished (Yes in step S15), the control device 5 executes the process of step S16.

In step S16, the control device 5 determines whether or not the work in a predetermined work section (here, the first work section 2A) is finished. If it is determined that works for all work target areas in the first work section 2A are not finished (No in step S16), the control device 5 returns to step S11.

Here, since only the work on the work target area 200A is finished, the control device 5 executes the processes of steps S11 to S16 for a work target area 200B located above the work target area 200A. Then, as illustrated in FIG. 7, the control device 5 executes the processes of steps S11 to S16 for all work areas in the first work section 2A.

If it is determined that the work for all work target areas in the first work section 2A is finished (Yes in step S16), the control device 5 executes the process of step S17. In step S17, the control device 5 determines whether or not work in all work sections (here, the first work section 2A to the third work section 2C) is finished.

Here, since only the work in the first work section 2A is finished, the control device 5 determines that the work in all work sections is not finished (No in step S17), and returns to step S102. Next, the control device 5 causes the robot 1 to move to a next second work section 2B (step S102), and executes the processes of steps S102 to S107.

Then, after the control device 5 has executed the processes of step S11 to step S16 for all the work target areas in the second work section 2B (Yes in step S16), the control device 5 again determines that the work in all work sections is not finished (No in step S17), and returns to step S102. The control device 5 causes the robot 1 to move to a next third work section 2C (step S102), and executes the processes of steps S102 to S107 again.

Then, after the control device 5 has executed the processes from step S11 to step S16 on all work target areas in the third work section 2C (Yes in step S16), the control device 5 determines that the work in all work sections is finished (Yes in step S17) and terminates the program. Thus, the control device 5 can perform predetermined work on the workpiece 2.

Note that in Embodiment 1, a mode is employed in which the control device 5 corrects the position coordinates of the work start position 20A and the work end position 20B based on the position coordinates of the work start position 20A and the work end position 20B detected in steps S11 and S12, but the embodiment is not limited to this.

For example, a mode may be employed in which the control device 5 corrects the position coordinates of the work start position 20A and the work end position 20B stored in the storage unit based on the position coordinates of the workpiece 2 (first work section 2A) calibrated in step S106. In this case, the position detection sensor 14 may be constituted of an optical sensor.

Further, when the control device 5 corrects the position coordinates of the work start position 20A and the work end position 20B based on the position coordinates of the work start position 20A and the work end position 20B detected in step S11 and step S12, the position detection sensor 14 may be constituted of a camera, or may be constituted of both a camera and an optical sensor.

Incidentally, in the robot system 100 according to Embodiment 1, an error may occur with respect to position coordinates of the robot 1 due to self-traveling of the robot 1. Further, since the workpiece 2 is carried into the work space, an error may occur in position coordinates of the workpiece 2. Then, if these errors occur together, positioning accuracy of the robot 1 relative to the workpiece 2 may decrease. Further, in order to reduce these errors, a sensor used in the robot 1 (for example, a three-dimensional coordinate measuring device), a drive motor, and so on must be highly accurate, but high precision sensors, and the like are expensive and make equipment costs of the robot system 100 high.

However, in the robot system 100 according to Embodiment 1, since the control device 5 performs calibration of the position coordinates of the workpiece 2 after calibrating the position coordinates of the robot 1, positioning with respect to the workpiece 2 can be performed with higher accuracy (for example, accuracy of 0.7 mm or less or 0.5 mm or less) while using an inexpensive sensor and so on.

Further, in the robot system 100 according to Embodiment 1, since the support member 3 suspends and supports the large panel-shaped workpiece 2, the workpiece 2 may bend. Thus, when the robot 1 performs work on the workpiece 2, the robot 1 may collide with the workpiece 2 unless a bending amount of the workpiece 2 is taken into consideration.

However, in the robot system 100 according to Embodiment 1, the work on the workpiece 2 is performed while being divided into the first work section 2A to the third work section 2C for the plurality of respective reference positions 32A to 32C. Thus, an influence on the robot 1 with respect to the bending amount of the workpiece 2 can be reduced, and a collision of the robot 1 with the workpiece 2 can be suppressed.

Further, in the robot system 100 according to Embodiment 1, the control device 5 is configured to perform work on the workpiece 2 from a work target area close to the reference position in each work section. Specifically, for example, the control device 5 is configured to perform work on the workpiece 2 from the work target area 200A close to the reference position 32A in the first work section 2A.

Thus, the influence on the robot 1 with respect to the bending amount of the workpiece 2 can be further reduced, and a collision of the robot 1 with the workpiece 2 can be further suppressed.

Further, since the robot 1 is moved to a work target area close to the reference position, a moving time thereof can be shortened, and position coordinates of a work start position and a work end position of the work target area can be detected in a short time. Thus, a working time of work on the workpiece 2 can be shortened.

Modification Example 1

Next, a modification example of the robot system according to Embodiment 1 will be described.

In a robot system of Modification Example 1 according to Embodiment 1, the support member is configured to be movable along a traveling shaft different from the traveling shaft on which a carriage or a robot travels.

Hereinafter, an example of the robot system of Modification Example 1 in Embodiment 1 will be described.

Figure 8:
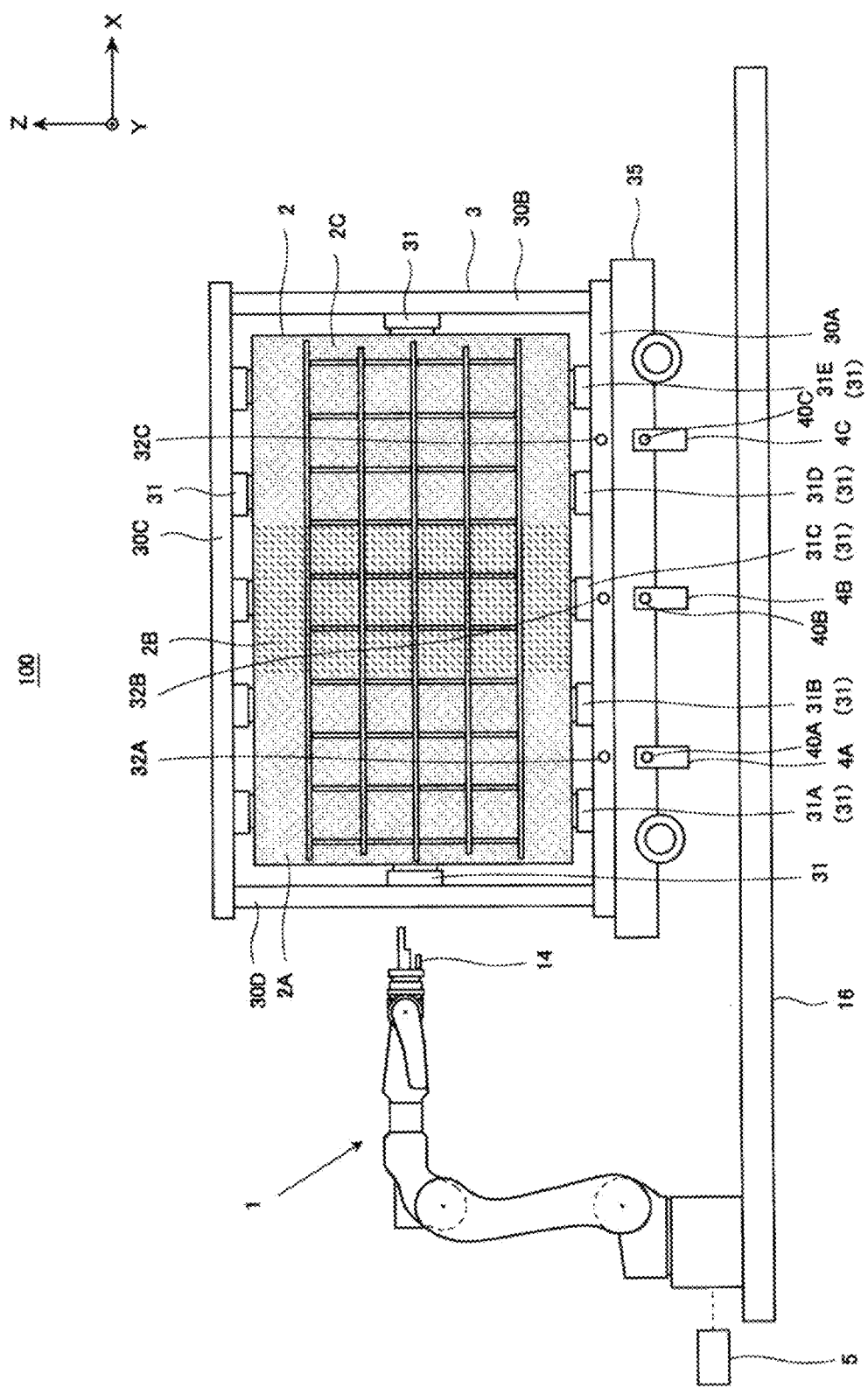
FIG. 8 is a schematic view illustrating a schematic configuration of a robot system according to Modification Example 1 in Embodiment 1.

FIG. 8 is a schematic view illustrating a schematic configuration of the robot system according to Modification Example 1 in Embodiment 1. Note that in FIG. 8, directions in the robot system are represented by directions of an X axis, a Y axis, and a Z axis of a three-dimensional orthogonal coordinate system for convenience, and work sections in a workpiece are hatched.

As illustrated in FIG. 8, a robot system 100 of Modification Example 1 according to Embodiment 1 has a same basic configuration as the robot system 100 according to Embodiment 1, but differs in that the support member 3 includes a carriage 35. Specifically, a frame (four bar members 30A, 30B, 30C, and 30D) constituting the support member 3 is mounted on the carriage 35. Thus, the support member 3 can move a workpiece 2 relative to calibration positions 40A, 40B, and 40C.

The robot system 100 of Modification Example 1 in Embodiment 1 configured as described above achieves operations and effects similar to those of the robot system 100 according to Embodiment 1.

Note that in the robot system 100 of Modification Example 1 according to Embodiment 1, a mode is employed in which the support member 3 further has the carriage 35, but the embodiment is not limited to this. For example, the support member 3 may be configured to be movable along a traveling shaft that is different from the traveling shaft 16 on which the robot 1 travels.

Further, the support member 3 may be configured to be capable of self-traveling under control of the control device 5, or may be configured to be movable by an operator or the like.

Embodiment 2

A robot system according to Embodiment 2 is such that in the robot system according to Embodiment 1 (including the modification example), the support member has a plurality of fixing parts that sandwich and fix the workpiece, at least one of the fixing parts that is disposed in a lower end portion of the support member is provided with a fixed reference position so as to correspond to the reference positions, and the control device is configured to operate the robot so that the position detection sensor detects the fixed reference position after the control device calibrates the position coordinates of the workpiece, and subsequently cause the robot to perform work on the workpiece from a work target area close to the fixed reference position on the workpiece.

Hereinafter, an example of the robot system according to Embodiment 2 will be described with reference to FIGS. 9 to 11.

[Configuration of Robot System]

Figure 9:
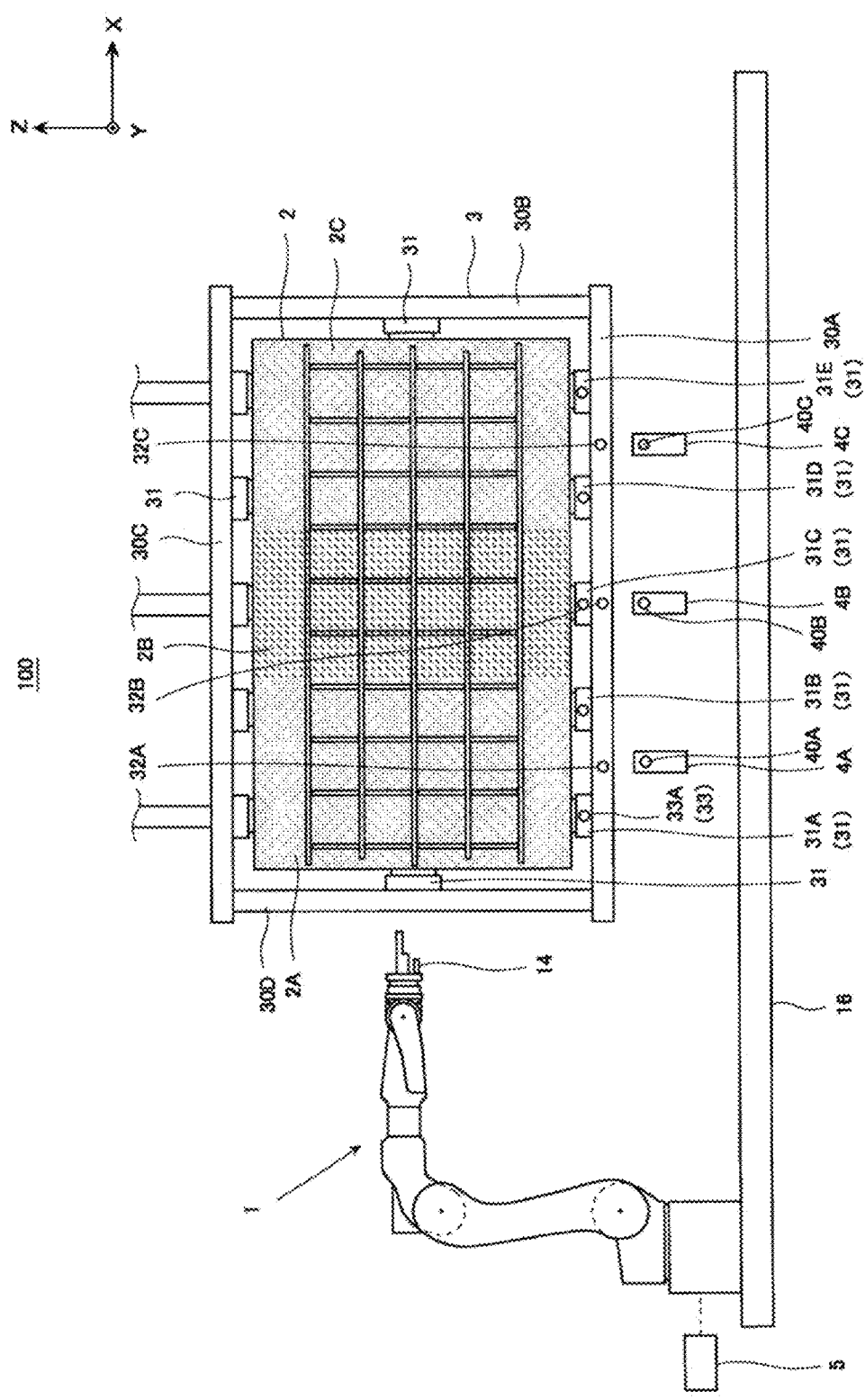
FIG. 9 is a schematic view illustrating a schematic configuration of a robot system according to Embodiment 2.

FIG. 9 is a schematic view illustrating a schematic configuration of the robot system according to Embodiment 2. Note that in FIG. 9, directions in the robot system are represented by directions of an X axis, a Y axis, and a Z axis of a three-dimensional orthogonal coordinate system for convenience, and work sections in a workpiece are hatched.

As illustrated in FIG. 9, a robot system 100 according to Embodiment 2 has a same basic configuration as the robot system 100 according to Embodiment 1, but differs in that a fixed reference position 33 (e.g., 33A) is disposed in each fixing part 31 provided on the bar member 30A.

The fixed reference positions 33 are disposed at positions closer to the workpiece 2 than the reference positions 32A to 32C, and are configured to be detectable by the position detection sensor 14. For example, when the position detection sensor 14 is constituted of a regression reflection type optical sensor, the fixed reference positions 33 may be constituted of regression reflecting plates. Further, when the position detection sensor 14 is constituted of a camera, the fixed reference positions 33 may each be constituted of a marker having a triangle shape, a quadrangular shape, a three-dimensional shape, or the like.

Note that in Embodiment 2, a configuration in which the fixed reference position 33 is disposed in each fixing part 31 is employed, but the present invention is not limited to this. It is sufficient if the fixed reference position 33 is disposed in any fixing part 31 out of the fixing parts 31, and the number of the fixed reference positions 33 is not limited.

[Operations and Effects of Robot System]

Next, operations and effects of the robot system 100 according to Embodiment 2 will be described with reference to FIGS. 9 to 11. Note that the following operations are executed by the arithmetic unit of the control device 5 reading out a program stored in a storage unit. Further, in the following, as illustrated in FIG. 11, an operation of applying a sealing agent to the workpiece 2 will be described as a specific example of an operation of the robot system 100 according to Embodiment 2.

Figure 10:
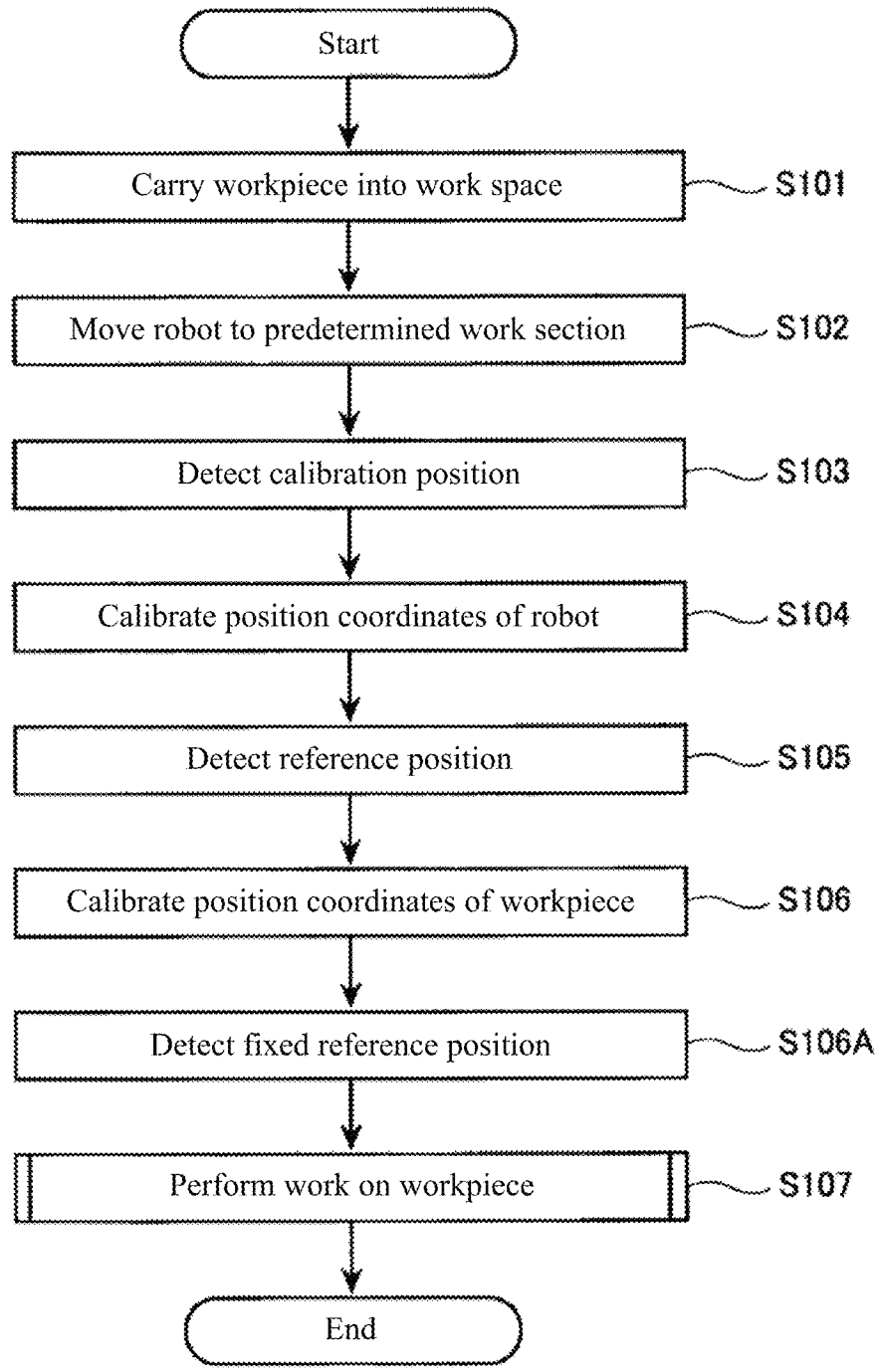
FIG. 10 is a flowchart illustrating an example of operation of the robot system according to Embodiment 2.
Figure 11:
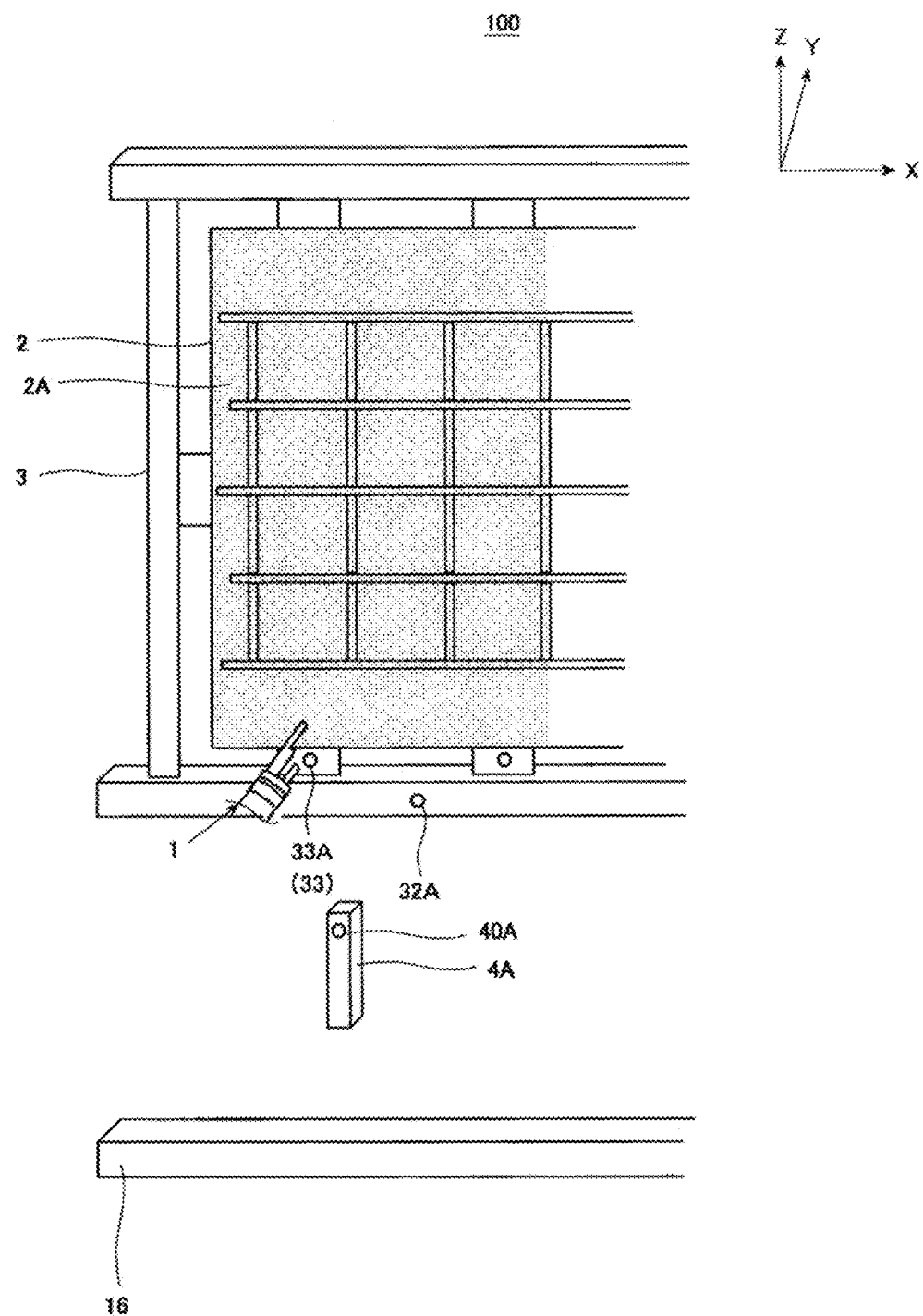
FIG. 11 is a schematic view illustrating an example of operation of the robot system according to Embodiment 2.

FIG. 10 is a flowchart illustrating an example of operation of the robot system according to Embodiment 2. FIG. 11 is a schematic view illustrating an example of operation of the robot system according to Embodiment 2.

As illustrated in FIG. 10, operations of the robot system 100 according to Embodiment 2 are basically the same as the operations of the robot system 100 according to Embodiment 1, but differ in that after the process of step S106, a process of step S106A is executed.

Specifically, the control device 5 calibrates position coordinates of a workpiece 2 (work section 2A) based on position coordinates of the reference position 32A obtained in step S105 (step S106). Then, the control device 5 operates the robot 1 so that the fixed reference position 33A of the support member 3 is detected by the position detection sensor 14 (step S106A; see FIG. 11).

Next, the control device 5 causes the robot 1 to perform predetermined work (here, sealing work) on the workpiece 2 (step S107).

Note that the process in step S107 (predetermined work operation on the workpiece) is the same as that of the robot system 100 according to Embodiment 1, and thus detailed description thereof is omitted.

The robot system 100 according to Embodiment 2 configured as described above achieves operations and effects similar to those of the robot system 100 according to Embodiment 1.

Further, in the robot system 100 according to Embodiment 2, the fixed reference positions 33 are disposed at positions closer to the workpiece 2 than the reference positions 32A to 32C. Then, the control device 5 causes a distal end of the robot 1 to move to the fixed reference position 33A that is a position closer to the workpiece 2 than the reference position 32A (step S106A), and subsequently position coordinates of the work start position 20A in the work target area 200A are detected (step S11).

Thus, as compared with the robot system 100 according to Embodiment 1, the robot system 100 according to Embodiment 2 can further reduce an influence on the robot 1 with respect to the bending amount of the workpiece 2, and can further suppress a collision of the robot 1 with the workpiece 2.

Further, in the robot system 100 according to Embodiment 2, since the robot 1 is moved to a work target area from the fixed reference position 33 closer to the workpiece 2 than the reference position, a moving time thereof can be shortened as compared with the robot system 100 according to Embodiment 1, and position coordinates of a work start position and a work end position of the work target area can be detected in short time. Thus, the robot system 100 according to Embodiment 2 can reduce a working time of work on the workpiece 2 as compared with the robot system 100 according to Embodiment 1.

Embodiment 3

A robot system according to Embodiment 3 further includes a temperature detector in the robot system according to Embodiment 1 (including the modification example) or 2, in which the calibration positions of the calibration members and the reference positions are arranged to correspond to each other, and the control device is configured to perform calibration of the position coordinates of the robot, for each of the work sections, when a difference of a temperature detected by the temperature detector is equal to or greater than a predetermined first temperature difference.

Hereinafter, an example of the robot system according to Embodiment 3 will be described with reference to FIGS. 12 and 13.

[Configuration of Robot System]

Figure 12:
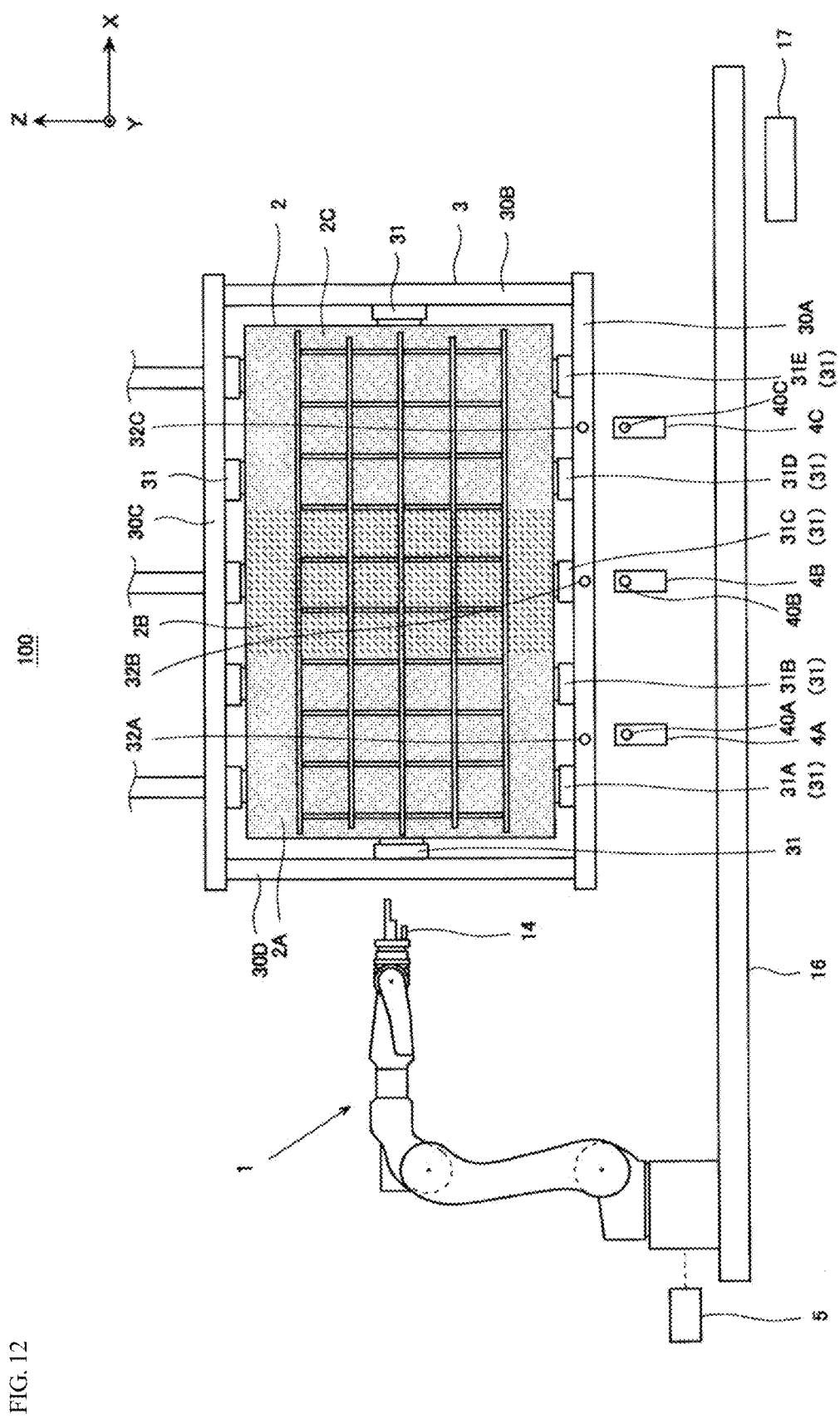
FIG. 12 is a schematic view illustrating a schematic configuration of a robot system according to Embodiment 3.

FIG. 12 is a schematic view illustrating a schematic configuration of the robot system according to Embodiment 3. Note that in FIG. 12, directions in the robot system are represented by directions of an X axis, a Y axis, and a Z axis of a three-dimensional orthogonal coordinate system for convenience, and work sections in a workpiece are hatched.

As illustrated in FIG. 12, a robot system 100 according to Embodiment 3 has a same basic configuration as the robot system 100 according to Embodiment 1, but differs in that a temperature detector 17 is further provided. The temperature detector 17 is configured to detect a temperature in a work space and output the detected temperature to the control device 5. As the temperature detector 17, a publicly known temperature sensor such as a thermocouple or a thermistor can be used. Note that the temperature detector 17 may be configured to detect a temperature of the traveling shaft 16.

[Operations and Effects of Robot System]

Next, operations and effects of the robot system 100 according to Embodiment 3 will be described with reference to FIGS. 12 and 13. Note that the following operations are executed by the arithmetic unit of the control device 5 reading out a program stored in a storage unit.

Incidentally, the temperature in the work space may rise due to exhaust heat from a drive motor or the like due to the robot 1 performing work. Further, when air conditioning in the work space becomes inadequate, the temperature in the work space may rise. Furthermore, when the temperature difference between day and night is large, the temperature in the work space may decrease at night.

In such a case, metal constituting the traveling shaft 16 and/or the robot 1 is slightly deformed due to thermal expansion or the like. When it is preferred to perform positioning with respect to the workpiece 2 with higher accuracy, a displacement of position coordinates of the robot 1 due to deformation of the traveling shaft 16 cannot be ignored, and it is preferred to perform calibration of the position coordinates of the robot 1 by detecting a calibration position.

On the other hand, if the temperature in the work space is within a predetermined range, an influence on accuracy by deformation due to thermal expansion of the traveling shaft 16 is small, and thus accuracy of the position coordinates of the robot 1 can be ensured without performing calibration of the position coordinates of the robot 1 by detecting the calibration position 40B in the second work section 2B. Similarly, accuracy of the position coordinates of the robot 1 can be ensured without performing calibration of the position coordinates of the robot 1 by detecting the calibration position 40C in the third work section 2C.

Figure 13:
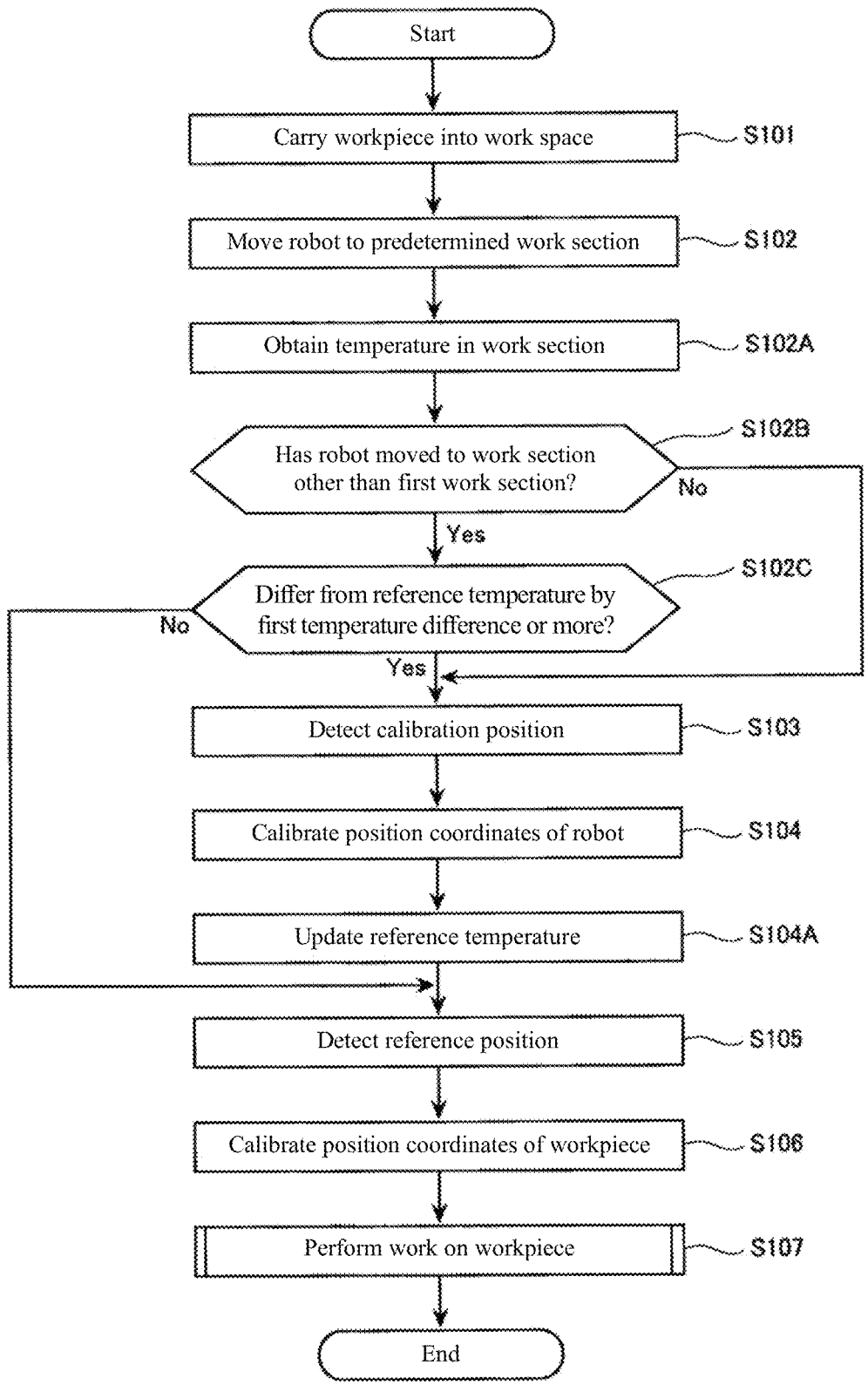
FIG. 13 is a flowchart illustrating an example of operation of the robot system according to Embodiment 3.

Thus, the robot system 100 according to Embodiment 3 is configured to execute a flow illustrated in FIG. 13.

FIG. 13 is a flowchart illustrating an example of operation of the robot system according to Embodiment 3.

As illustrated in FIG. 13, basic operations of the robot system 100 according to Embodiment 3 are the same as those of the robot system 100 according to Embodiment 1 but differ in that the operations (processes) of step S102A to step S102C are executed between step S102 and step S103, and the operation (process) of step S104A is executed between step S104 and step S105.

Specifically, the control device 5 causes the robot 1 to move to a predetermined work section (step S102). Then, the control device 5 obtains a temperature in the work space detected by the temperature detector 17 from the temperature detector 17 (step S102A).

Next, the control device 5 determines whether or not the robot 1 has moved to a work section other than the first work section 2A (step S102B). Note that the control device 5 may determine whether or not calibration of position coordinates of the robot 1 has already been performed, instead of the process of step S102B.

If it is determined that the robot 1 has not moved to a work section other than the first work section 2A, that is, if it is determined that the robot 1 has moved to the first work section 2A (No in step S102B), the control device 5 executes the process of step S103 since it is preferred to perform calibration of the position coordinates of the robot 1.

Then, the control device 5 obtains (detects) position coordinates of the calibration position 40A based on data related to the calibration position 40A detected by the position detection sensor 14 (step S103), and calibrates the position coordinates of the robot 1 based on position coordinate information of the calibration position 40A obtained in step S103 (step S104).

Next, the control device 5 updates (sets) the temperature in the work space obtained in step S102A as a reference temperature (step S104A). Specifically, the control device 5 stores the temperature in the work space obtained in step S102A in the storage unit as the reference temperature.

Next, similarly to the robot system 100 according to Embodiment 1, the control device 5 executes the operations (processes) of step S105 to step S107, and terminates this program.

On the other hand, if it is determined that the robot 1 has moved to a work section other than the first work section 2A (Yes in step S102B), the control device 5 executes the process of step S102C.

In step S102C, the control device 5 determines whether or not a difference between the reference temperature updated (set) in step S104A and the temperature obtained in step S102A is equal to or greater than a predetermined first temperature difference set in advance. Here, the first temperature difference is set in advance by experiments or the like, and is set appropriately so that deformation due to thermal expansion or the like of the traveling shaft 16 and/or the robot 1 falls within an allowable range of error of positional coordinate displacement of the robot 1 or within an allowable range of positioning accuracy error with respect to the workpiece 2. The first temperature difference may be, for example, 5° C., 7° C., or 10° C.

If it is determined that the difference between the reference temperature and the temperature obtained in step S102A is equal to or greater than the first temperature difference (Yes in step S102C), the control device 5 detects a calibration position (step S103), and the position coordinates of the robot 1 are calibrated (step S104). Then, the control device 5 updates the temperature obtained in step S102A as a reference temperature (step S104A), executes the operations (processes) of step S105 to step S107, and terminates this program.

On the other hand, if it is determined that the difference between the reference temperature and the temperature obtained in step S102A is less than the first temperature difference (No in step S102C), the control device 5 executes the operations (processes) of step S105 to step S107, and terminates this program.

Note that the processes from step S105 to step S107 are executed similarly to those of Embodiment 1, and thus detailed description thereof will be omitted.

The robot system 100 according to Embodiment 3 configured as described above achieves operations and effects similar to those of the robot system 100 according to Embodiment 1.

Further, in the robot system 100 according to Embodiment 3, when the temperature detected by the temperature detector 17 differs from the reference temperature by the first temperature difference or more, the control device 5 performs calibration of the position coordinates of the robot 1 by detecting the calibration position. Thus, positioning with respect to the workpiece 2 can be performed with higher accuracy.

Furthermore, in the robot system 100 according to Embodiment 3, when the temperature detected by the temperature detector 17 differs from the reference temperature by less than the first temperature difference, the control device 5 does not perform calibration of the position coordinate of the robot 1 by detection of the calibration position 40B or the calibration position 40C in the second work section 2B or the third work section 2C. Thus, a working time of work on the workpiece 2 can be shortened.

From the above description, many improvements or other embodiments of the present invention will be apparent to those skilled in the art. Therefore, the above description should be taken as exemplary only, and is provided for the purpose of teaching those skilled in the art the best mode for carrying out the present invention. The structural and/or functional details may be substantially altered without departing from the present invention.

INDUSTRIAL APPLICABILITY

A robot system and an operating method thereof of the present disclosure can achieve positioning with respect to the workpiece with higher accuracy, and thus are useful in the field of robots.

REFERENCE SIGNS LIST 1 robot
2 workpiece
2A first work section
2B second work section
2C third work section
3 support member
4A calibration member
5 control device
11a first link
11b second link
11c third link
11d fourth link
11e fifth link
11f sixth link
12 end effector
14 position detection sensor
15 base
16 traveling shaft
17 temperature detector
20A work start position
20B work end position
30A bar member
30B bar member
30C bar member
30D bar member
31 fixing part
31A fixing part
31B fixing part
31C fixing part
31D fixing part
31E fixing part
32A reference position
32B reference position
32C reference position
33 fixed reference position
35 carriage
40A calibration position
40B calibration position
40C calibration position
100 robot system
200A work target area
JT1 first joint
JT2 second joint
JT3 third joint
JT4 fourth joint
JT5 fifth joint
JT6 sixth joint

The invention claimed is:

1. An operating method of a robot system,
the robot system including:
a robot that self-travels along a traveling shaft and has an arm provided with a position detection sensor at a distal end;
a support structure that has reference positions juxtaposed along an extending direction of the traveling shaft, and is configured to support a workpiece; and
calibrators that are juxtaposed along the traveling shaft and each calibrator has a calibration position,
the support structure being configured to move the workpiece relative to the calibration positions,
the operating method comprising:
causing the robot to move by a predetermined distance set in advance along the traveling shaft;
operating the robot so that the position detection sensor detects the calibration positions;
calibrating position coordinates of the robot based on position coordinates of the calibration positions detected by the position detection sensor;
operating, after the calibrating of the position coordinates of the robot, the robot so that the position detection sensor detects the reference positions; and calibrating position coordinates of the workpiece based on position coordinates of the reference positions detected by the position detection sensor.

2. The operating method of the robot system according to claim 1, wherein
the workpiece is divided into work sections for the respective reference positions, and
the operating of the robot and the calibrating of the position coordinates of the workpiece are performed for each of the work sections.

3. The operating method of the robot system according to claim 1, further comprising: causing the robot to perform work on the workpiece from a work target area close to the reference positions on the workpiece after the calibrating of the position coordinates of the workpiece.

4. The operating method of the robot system according to claim 1, wherein the support structure is formed in a frame shape, and reference positions are juxtaposed on a lower end portion of the support structure.

5. The operating method of the robot system according to claim 3, wherein
the support structure has fixing parts that sandwich and secure the workpiece,
at least one of the fixing parts that is disposed in a lower end portion of the support structure is provided with a fixed reference position so as to correspond to the reference positions, and
the causing the robot to perform work on the workpiece from a work target area close to the reference positions on the workpiece includes:
operating the robot so that the position detection sensor detects the fixed reference position after the calibrating of the position coordinates of the workpiece, and
causing the robot to perform work on the workpiece from a work target area close to the fixed reference position on the workpiece.

6. The operating method of the robot system according to claim 1, wherein the position detection sensor is an optical sensor.

7. The operating method of the robot system according to claim 1, wherein the position detection sensor is a camera.

8. The operating method of the robot system according to claim 2, wherein the robot system further includes a temperature detector, wherein
the calibration positions of the calibrators and the reference positions are arranged to correspond to each other, and
the operating the robot so that the position detection sensor detects the calibration positions and the calibrating of the position coordinates of the robot are performed, for each of the work sections, when a temperature detected by the temperature detector is equal to or greater than a predetermined first temperature difference set in advance with respect to a reference temperature.

9. A robot system comprising:
a robot that self-travels along a traveling shaft and has an arm provided with a position detection sensor at a distal end;
calibrators that are juxtaposed along the traveling shaft and each calibrator has a calibration position;
a support structure that has reference positions juxtaposed along an extending direction of the traveling shaft, and is configured to support a workpiece; and
means for controlling, wherein the support structure is configured to be capable of moving the workpiece relative to the calibration positions, and
the means for controlling
causes the robot to move by a predetermined first distance set in advance along the traveling shaft,
operates the robot so that the position detection sensor detects the calibration positions,
calibrates position coordinates of the robot based on position coordinates of the calibration positions detected by the position detection sensor,
subsequently operates the robot so that the position detection sensor detects the reference positions, and
calibrates position coordinates of the workpiece based on position coordinates of the reference positions detected by the position detection sensor.

10. The robot system according to claim 9, wherein the means for controlling divides the workpiece into work sections for the respective reference positions, and performs calibration of the position coordinates of the workpiece for each of the work sections.

11. The robot system according to claim 9, wherein the means for controlling causes the robot to perform work on the workpiece from a work target area close to the reference positions on the workpiece after calibrating the position coordinates of the workpiece based on the position coordinates of the reference positions detected by the position detection sensor.

12. The robot system according to claim 9, wherein the support structure is formed in a frame shape, and reference positions are juxtaposed on a lower end portion of the support structure.

13. A robot system comprising:
a robot that self-travels along a traveling shaft and has an arm provided with a position detection sensor at a distal end;
calibrators that are juxtaposed along the traveling shaft and each calibrator has a calibration position;
a support structure that has reference positions juxtaposed along an extending direction of the traveling shaft, and is configured to support a workpiece, wherein the support structure is configured to be capable of moving the workpiece relative to the calibration positions; and
circuitry configured to:
cause the robot to move by a predetermined first distance set in advance along the traveling shaft,
operate the robot so that the position detection sensor detects the calibration positions,
calibrate position coordinates of the robot based on position coordinates of the calibration positions detected by the position detection sensor,
subsequently operate the robot so that the position detection sensor detects the reference positions, and
calibrate position coordinates of the workpiece based on position coordinates of the reference positions detected by the position detection sensor.

14. The robot system according to claim 13, wherein the circuitry is configured to divide the workpiece into work sections for the respective reference positions, and perform calibration of the position coordinates of the workpiece for each of the work sections.

15. The robot system according to claim 13, wherein the circuitry is configured to cause the robot to perform work on the workpiece from a work target area close to the reference positions on the workpiece after calibrating the position coordinates of the workpiece based on the position coordinates of the reference positions detected by the position detection sensor.

16. The robot system according to claim 13, wherein the support structure is formed in a frame shape, and reference positions are juxtaposed on a lower end portion of the support structure.

17. The robot system according to claim 15, wherein
the support structure has fixing parts that sandwich and secure the workpiece,
at least one of the fixing parts that is disposed in a lower end portion of the support structure is provided with a fixed reference position so as to correspond to the reference positions, and
the circuitry is configured to
operate the robot so that the position detection sensor detects the fixed reference position after the circuitry calibrates the position coordinates of the workpiece, and
subsequently cause the robot to perform work on the workpiece from a work target area close to the fixed reference position on the workpiece.

18. The robot system according to claim 13, wherein the position detection sensor is an optical sensor.

19. The robot system according to claim 13, wherein the position detection sensor is a camera.

20. The robot system according to claim 14, further comprising a temperature detector, wherein
the calibration positions of the calibrators and the reference positions are arranged to correspond to each other, and
the circuitry is configured to perform calibration of the position coordinates of the robot, for each of the work sections, when a difference between a reference temperature and a temperature detected by the temperature detector is equal to or greater than a predetermined first temperature difference set in advance.

* * * * *